US012451381B2

(12) United States Patent
Shi

(10) Patent No.: US 12,451,381 B2
(45) Date of Patent: Oct. 21, 2025

(54) SCHEDULING MULTIPLE PRODUCTION STEPS UNDER Q-TIME CONSTRAINTS IN SEMICONDUCTOR MANUFACTURING

(71) Applicant: Weiping Shi, Austin, TX (US)

(72) Inventor: Weiping Shi, Austin, TX (US)

(*) Notice: Subject to any disclaimer, the term of this patent is extended or adjusted under 35 U.S.C. 154(b) by 705 days.

(21) Appl. No.: 17/852,343

(22) Filed: Jun. 28, 2022

(65) Prior Publication Data

US 2022/0415681 A1    Dec. 29, 2022

Related U.S. Application Data

(60) Provisional application No. 63/216,183, filed on Jun. 29, 2021.

(51) Int. Cl.
*H01L 21/67* (2006.01)
*G05B 19/418* (2006.01)

(52) U.S. Cl.
CPC .... *H01L 21/67276* (2013.01); *G05B 19/4188* (2013.01); *G05B 2219/45031* (2013.01)

(58) Field of Classification Search
CPC .......... G05B 19/4188; G05B 19/41865; G05B 2219/32252; G05B 2219/32265; G05B 2219/32266; G05B 2219/32291; G06Q 50/04; G06Q 10/0633; H01L 21/67276; Y02P 90/02; Y02P 90/30
See application file for complete search history.

(56) References Cited

U.S. PATENT DOCUMENTS

| | | | |
|---|---|---|---|
| 6,931,296 B2* | 8/2005 | Lin | G05B 19/41865 700/101 |
| 7,463,939 B1* | 12/2008 | Mata | G06Q 10/10 700/103 |
| 7,623,936 B1* | 11/2009 | Qu | G06Q 10/06 700/121 |
| 2004/0183559 A1* | 9/2004 | Ware | G11C 29/56004 714/E11.154 |
| 2005/0131564 A1* | 6/2005 | Chen | G05B 19/41865 700/100 |
| 2005/0154625 A1* | 7/2005 | Chua | G06Q 10/06 700/100 |
| 2008/0195241 A1* | 8/2008 | Lin | G05B 19/41865 700/100 |
| 2009/0228129 A1* | 9/2009 | Moyne | G06Q 10/06 706/47 |
| 2009/0259527 A1* | 10/2009 | Yang | G06Q 30/0601 705/28 |

(Continued)

*Primary Examiner* — Nicholas Klicos
(74) *Attorney, Agent, or Firm* — Zhong Law, LLC

(57) ABSTRACT

A system and method include dividing, by a processor of a manufacturing execution system (MES), a time axis associated with a time window into a plurality of time slots, assigning an integer value to an integer variable indexed by a slot identifier, a machine identifier, and a wafer lot identifier, specifying one or more constraints based on the integer variable, wherein the one or more constraints comprise a wafer quantity constraint and a Q-time constraint, executing an optimization solver under the one or more constraints to determine a time and a quantity of wafer lots to be provided to each machine associated with the time window, and issuing a request to a controller to cause provision of the quantity of wafer lots to each machine associated with each step in the time window.

20 Claims, 5 Drawing Sheets

(56) References Cited

U.S. PATENT DOCUMENTS

| | | | |
|---|---|---|---|
| 2009/0326996 A1* | 12/2009 | Goh | G06Q 50/04 |
| | | | 705/7.27 |
| 2016/0147219 A1* | 5/2016 | Siddiqui | G05B 19/41865 |
| | | | 700/101 |
| 2019/0072857 A1* | 3/2019 | Kupers | G03F 7/705 |
| 2021/0141014 A1* | 5/2021 | Kwon | G01R 31/2894 |

* cited by examiner

SCHEDULING MULTIPLE PRODUCTION STEPS UNDER Q-TIME CONSTRAINTS IN SEMICONDUCTOR MANUFACTURING

RELATED APPLICATION

This application claims priority benefit to U.S. Provisional Application 632/216,183 filed Jun. 29, 2021, the content of which is incorporated by reference in its entirety.

TECHNICAL FIELD

The present disclosure relates to a system and method to control the manufacture process of semiconductor products, and in particular, to schedule the processing of wafer lots under time requirements (referred to as the Q-times) while maximizing throughput and/or minimizing cycle time, in semiconductor manufacture plants.

BACKGROUND

A plant may include different types of machines to perform a series of steps of a manufacturing process that produces the eventual products. For example, the manufacture process to fabricate semiconductor products may include the steps of wet cleans, photolithography, Ion implantation, dry etching, wet etching, plasma ashing, thermal treatments, chemical vapor deposition (CVD), physical vapor deposition (PVD), molecular beam epitaxy (MBE), electrochemical deposition (ECD), chemical-mechanical planarization (CMP), wafer testing, and wafer backgrinding. Each of these steps (or sub-steps) may be performed once or repeatedly during the manufacture process. Each step may be performed by one or more semiconductor manufacture machines (or groups of machines), and each machine may participate in one or more than one steps. Thus, a piece of raw wafer may undergo the steps (and sub-steps) of the manufacture process to produce the eventual products (e.g., the ICs).

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
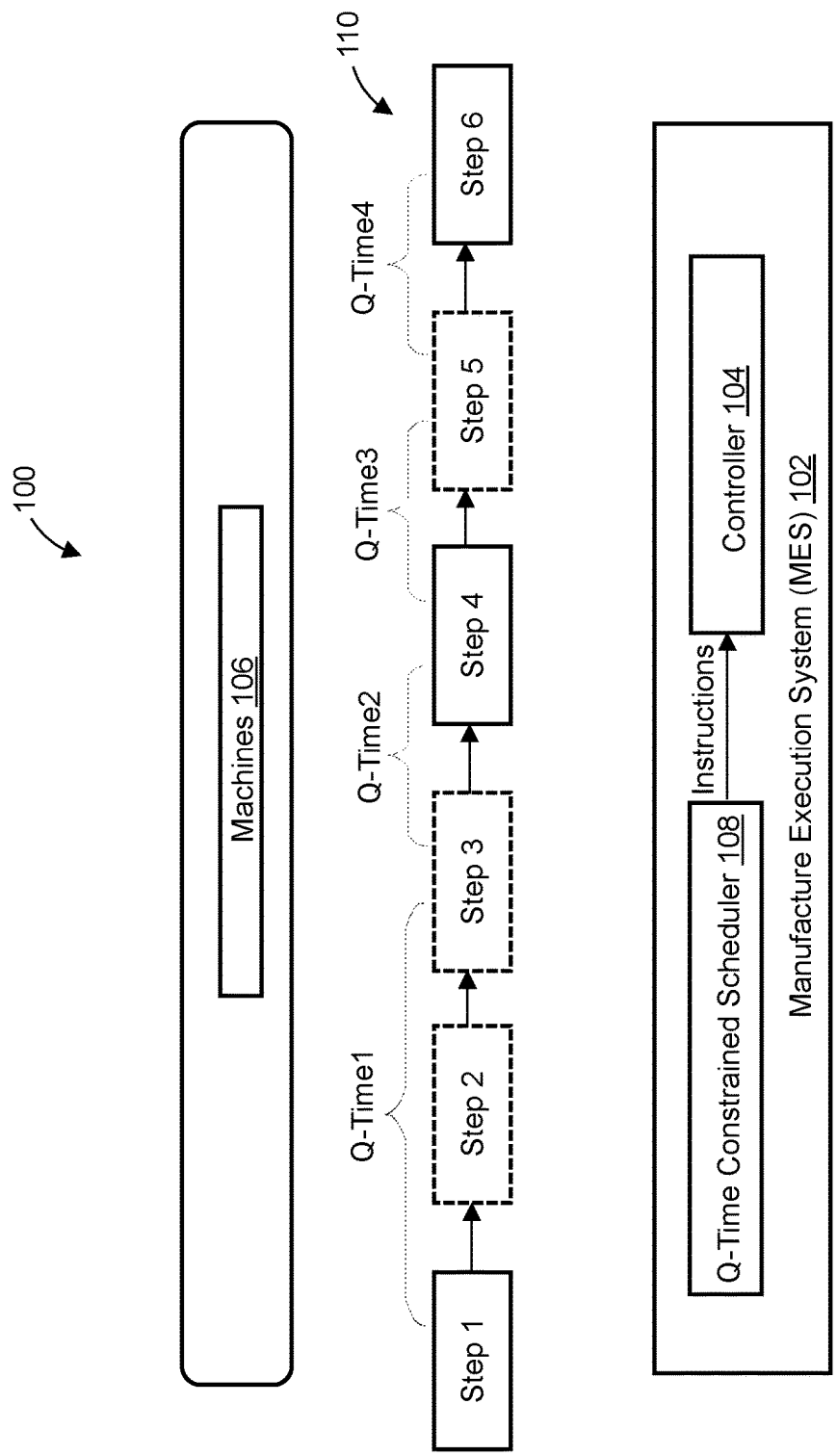
FIG. 1 illustrates a semiconductor manufacture plant implementing a Q-time constrained wafer/wafer lot scheduler according to an implementation of the present disclosure.

In one particular example, the plant may be a semiconductor manufacture plant (referred to as a FAB). The manufacture parts can be semiconductor wafers that undergo different manufacture steps to produce integrated circuits (ICs). Normally, an apparatus may carry up to 25 semiconductors wafers that can be processed and transported together. The wafers in the apparatus are collectively referred to as a wafer lot. To further increase the processing efficiencies, multiple lots may be processed together in batches. A batch step in a manufacture process may process more than one lots (e.g., 4 lots, each lot containing 25 wafers) together. The processing time to process the wafers is the same for each wafer processed by the batch step regardless of how many wafers in the batch. Therefore, it is desirable to maximize the number of wafer lots (or wafers) in each batch so that the utilization of the equipment deployed in the manufacture process is optimized. Because all wafers in the same batch share the same processing recipe, this constraint may cause certain lots in the batch to wait until enough wafers to be processed according to the same recipe arrive at the machine to form a batch. The wait for more wafers to arrive at the machine may cause a violation of certain time constraints such as the Q-time constraint described in the following sections.

A semiconductor manufacture plant may utilize thousands of machines to produce hundreds of products concurrently through one or more manufacture processes. Each manufacture process may include hundreds of steps (or sub-steps) needed for fabricating the products. Different types of machines may be deployed for different steps. A same type of machines can also be utilized to perform different steps in the manufacture process. Thus, the production capacity of a machine may be divided to meet the demands to perform different steps of the manufacture process, and the processing of each step may be carried out by a group of machines with varying capacity assigned to the step. For example, a lithography machine that may perform both device steps and interconnect steps may dedicate 30% of its capacity to the device steps and 70% of its capacity to the interconnect steps. The capacity division may be achieved by proportionally dividing the time of a day for which a machine spent on different steps (e.g., 30% of the day working on devices and 70% of the day working on interconnect).

Each machine may have a certain capacity to process a certain number of wafers (or numbers of wafer lots) associated with one or more manufacture steps for a duration of time (e.g., a day or a week). The manufacture process may include a sequence of manufacture steps through which a wafer is processed. At each step, the machines (or the machine group) assigned to the step may receive wafers that had been processed by machines of the previous step, and produce the wafers for the next step. To maximize the capability of the semiconductor manufacture plant, it is desirable to have all machines of the semiconductor manufacture plant to run at or substantially close to their full capacities.

The manufacture process may be associated with certain constraints to ensure the quality of the products. One type of constraints is a time constraint (e.g., a time limit) to perform the manufacture process or part of the manufacture process. This time constraint may require that certain consecutive or non-consecutive steps (e.g., steps $S_J$ to $S_K$, inclusive) of a manufacturing process for producing a certain product $P_i$ be completed within a determined time period. The time constraints can be a minimum time to complete the production of product $P_i$ or a maximum time to complete the production of product $P_i$, or can be a range of time, for example, between the minimum time and the maximum time to complete the production of product $P_i$. For example, steps $S_1$, $S_2$ and $S_3$ may be required to complete in a time range of 90 minutes and 120 minutes. These steps of a product that need to be performed with the time constraint are as a whole referred to as a Q-zone that can be represented by $Z(P_i, S_J, S_K)$ and the time allowed to perform these steps in the Q-zone is referred to as a Q-time requirement that can be represented by $T_{min}(P_i, S_J, S_K)$ or $T_{max}(P_i, S_J, S_K)$ associated with the Q-zone. If the processing of a wafer of $P_i$ spends longer than time $T_{max}(P_i, S_J, S_K)$ to complete steps $S_J$ to $S_K$, the wafer is deemed to be defective or unreliable. Similarly, if the processing of a wafer of $P_i$ spends less than time $T_{min}(P_i, S_J, S_K)$ to complete steps $S_J$ to $S_K$, the wafer is deemed as defective or unreliable. The unreliable wafer may require additional tests (or processing) to determine whether the wafer is defective or not. As such, violations of the Q-time requirement can cause a decrease of productivity due to defective wafers or an increase of production time due to the additional tests.

In some plants, the Q-zone may be defined as non-inclusive of the first step $S_1$ or the last step $S_K$. Under such a definition, the Q-zone may start after the completion of the first step until the start of the last step of the Q-zone. In general, this definition can be converted to the definition provided above by adding the processing time of the first step and the last step. For simplicity and convenience of discussion but not as a limitation, the Q-zone is defined to include the first and last steps in this disclosure.

It is possible that two Q-zones share overlapping steps. For example, the last step of a front Q-zone can be the first step of a subsequent Q-zone. In some situations, a Q-zone can be an isolated Q-zone that may have no other Q-zones in front or at behind.

The Q-zones may also overlap or nest. In other words, in Q-zones $Z_1(P_i, S_J, S_K)$ and $Z_2(P_i, S_{J'}, S_{K'})$, the steps may form the following relations J<J'<K<K', or J<J'<K'<K. For example, one product may have steps 1 to 5 in the first Q-zone, steps 3 to 8 in the second Q-zone, and steps 6 to 10 in the third Q-zone. In another example, another product may have steps 1 to 8 in the first Q-zone, steps 4 to 6 in the second Q-zone, and steps 6 to 10 in the third Q-zone. The three Q-zones may each have its own respective but non-contradictive Q-time requirement.

Each step of a Q-zone can be performed by a machine or a group of machines. On the other hand, a machine or a group of machines may perform steps associated with multiple Q-zones. Two different Q-zones of the same product may be performed by the same machine or same group of machines.

A semiconductor manufacturing plant may use a dispatcher system to assign wafer lots to machines. A dispatcher system is a software system that allows the plant operator to program certain rules in advance, and the rules are executed in real time during the manufacturing process.

As discussed above, it is desirable to maximize the number of wafer lots (or wafers) processed in a batch at a machine so as to improve the utilization of the machine. On the other hand, a large batch for multiple wafer lots may require certain wafer lots arrived earlier to wait for other wafer lots arrived later to make up the large batch. The wait time may cause violation of the Q-time constraint because the waiting time of wafer lots arrived earlier exceed the Q-time constraint. Therefore, there is a need to develop a system and method that may maximize the number of wafer lots (or wafers) in each of the batches under the Q-time constraint for each Q-zone in the manufacture process.

Implementations of the disclosure may include systems and methods that may maximize the equipment efficiency, while at the same time, eliminating or reducing Q-time violation. These implementations may be applied to maximize equipment efficiency for an entire manufacture process, or a segment of the manufacture process that contains multiple batch steps mixed with non-batch steps.

Figure 4:
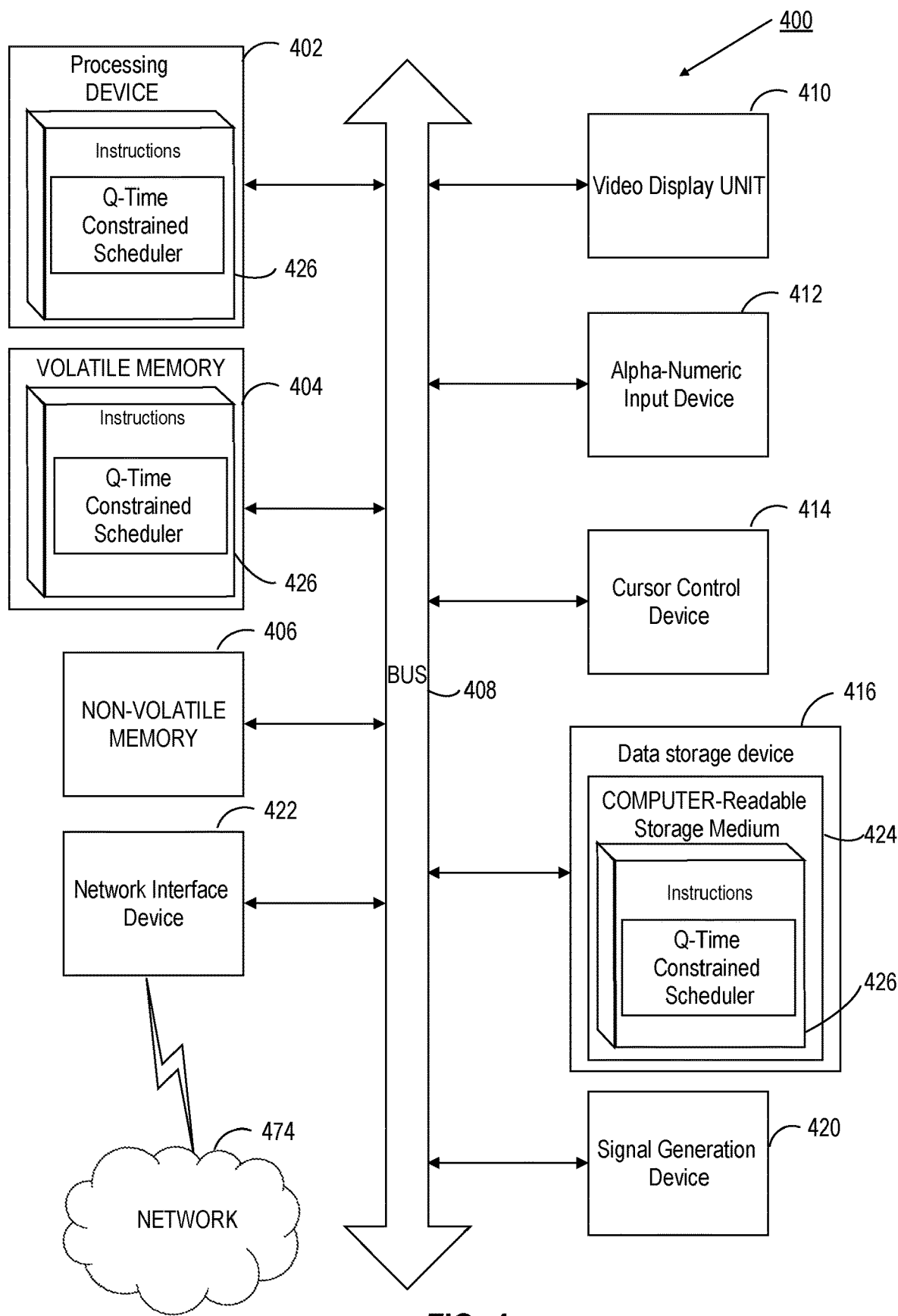
FIG. 4 depicts a block diagram of a computer system operating in accordance with one or more aspects of the present disclosure.

FIG. 1 illustrates a semiconductor manufacture plant 100 implementing a Q-time constrained wafer/wafer lot scheduler according to an implementation of the present disclosure. Plant 100 may include a manufacture execution system (MES) 102 that may control multiple machines 106 (e.g., M1-M_n, where n is an integer value) using a controller 104. MES 102 may use the controller as a dispatcher system that dispatches wafers or wafer lots to machines in a FAB. MES 102 can include a computer system (as shown in FIG. 4) including a processing device (e.g., a central processing unit (CPU)). MES 102 may also include a storage device (not shown) to store information associated with machines. The processing device may be configured and/or programmed to implement a Q-time constrained scheduler 108 that may schedule and use controller 104 to cause to deliver the optimal quantity of wafers/wafer lots to machines associated with each processing step under Q-time constraints.

A manufacture process 110 may include a series of steps (e.g., Steps 1-6 as shown in FIG. 1). The manufacture process 110 may include batch steps (e.g., Steps 1, 4, 6 represented in solid lines) and non-batch steps (e.g., Steps 2, 3, 5 represented in dashed line) as shown in FIG. 1. A batch step in the manufacture process 110 may perform a processing step on wafers/wafer lots in batches (i.e., more than one wafer lots) while a non-batch step cannot perform the processing step on wafers/wafer lots in batches. Instead, the non-batch step performs the processing step on a single lot. Multiple machines may be deployed for each step (batch or non-batch). As a comparison, the batch step may process wafer lots that can arrive at different times. It is observed that batch steps may be more difficult to schedule the quantity of wafers/wafer lots dispatched to machines than non-batch steps because multiple wafer lots are required to be scheduled in a batch step while the lots for a non-batch step may be scheduled individually. A Q-zone may include batch steps and non-batch steps.

Figure 2:
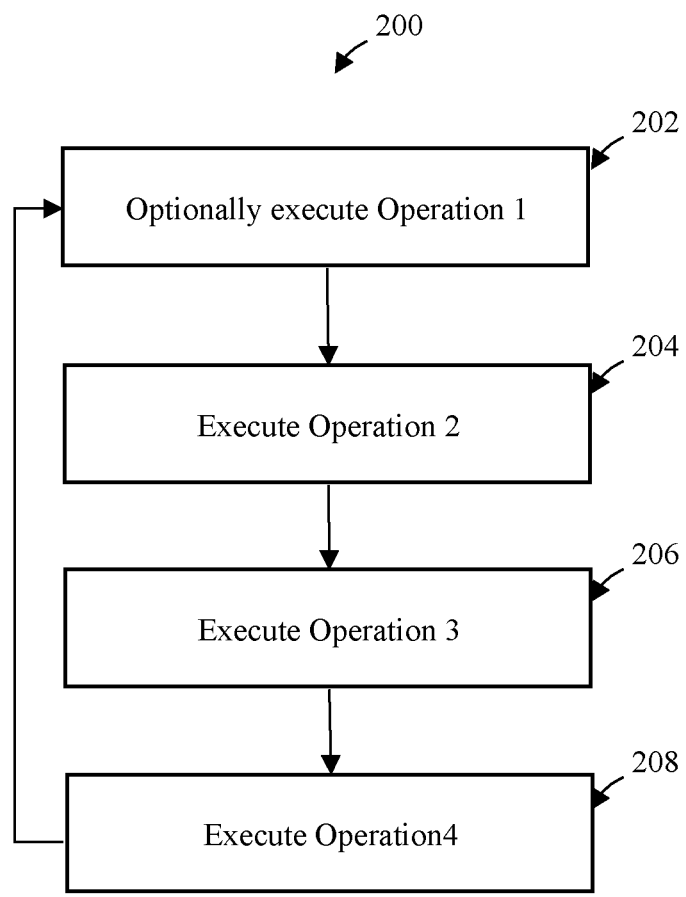
FIG. 2 illustrates operations for determining optimal delivery of wafers/wafer lots to machines under Q-time constraints according to an implementation of the disclosure.

In one implementation, the Q-time constrained scheduler 108 may perform several operations to achieve the Q-time constrained optimal wafers/wafer lots. Each operations may be designed to a particular situation and when these operations are combined together, to achieve an optimal delivery of wafers/wafer lots to machines. FIG. 2 illustrates four operations 200 for determining optimal delivery of wafers/wafer lots to machines under Q-time constraints according to an implementation of the disclosure. As shown in FIG. 2, the operations 200 may include Operations 1-4 that may be performed by a processing device of MES 102 at 202-208. Each of these Operations 1-4 is described in detail in the following.

Figure 5A:
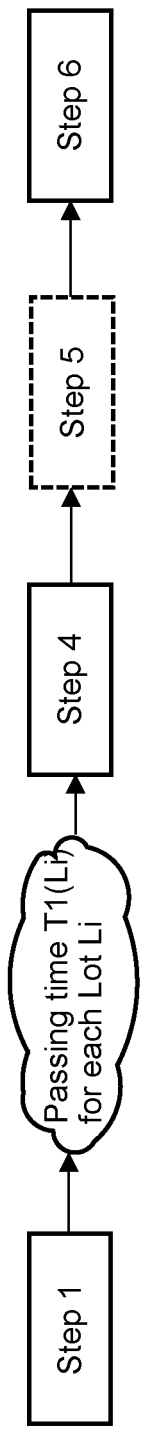
FIGS. 5A-5C illustrates different models of batch steps and non-batch steps according implementations of the disclosure.

In a situation where some steps are using machines whose utilization rate is below a pre-determined threshold U, Operation 1 may be executed at 202 to simplify those low utilization steps as described in the following. The performance of Operation 1 may convert a manufacture process or an identified segment of the manufacture process into a simplified model that may be optimized under the Q-time constraints associated with Q-zones. Operation 1 may include determining, by a processing device, low utilization steps in a manufacture process or an identified segment of the manufacture process, and simplifying these low utilization steps into an estimate of passing time which is defined as the time needed to process these low utilization steps collectively in the manufacture process or the identified segment of the manufacture process. The Q-time constraints associated with Q-zones may be extended between the remaining steps which may include high utilization non-batch steps. Thus, the segment of manufacture process as shown in FIG. 1 may be simplified to a model as shown in FIG. 5A in which consecutive Q-zones may be combined and characterized by respective passing times (e.g., $T_1(L_i)$, where $T_1$ is the combined passing time for non-batch steps 2 and 3 which include the processing time for steps 2 and 3, and estimated waiting time between steps 2 and 3). Because step 5 is highly utilized, step 5 is not simplified.

Q-time extension: The Q-time constraints between steps that are simplified in Operation 1 still need to be preserved. For example, if the Q-time between step 1 and step 3 is 8 hours, and the Q-time between step 3 and step 4 is 6 hours, then when simplifying non-batch steps 2 and 3 into a pass time, implementations may introduce a new Q-time constraint of 8+6=14 hours between step 1 and step 4.

Operation 2 executed at 204 may apply optimization solvers, such as linear programming, mixed integer linear programming, combinatorial optimization, simulated annealing, etc., to compute the optimal assignment of wafers/wafer lots to machines associated with each of the batch steps. In one implementation, as an example, the mixed integer linear programming (MILP) may be applied to the model established in step 1.

Figure 3:
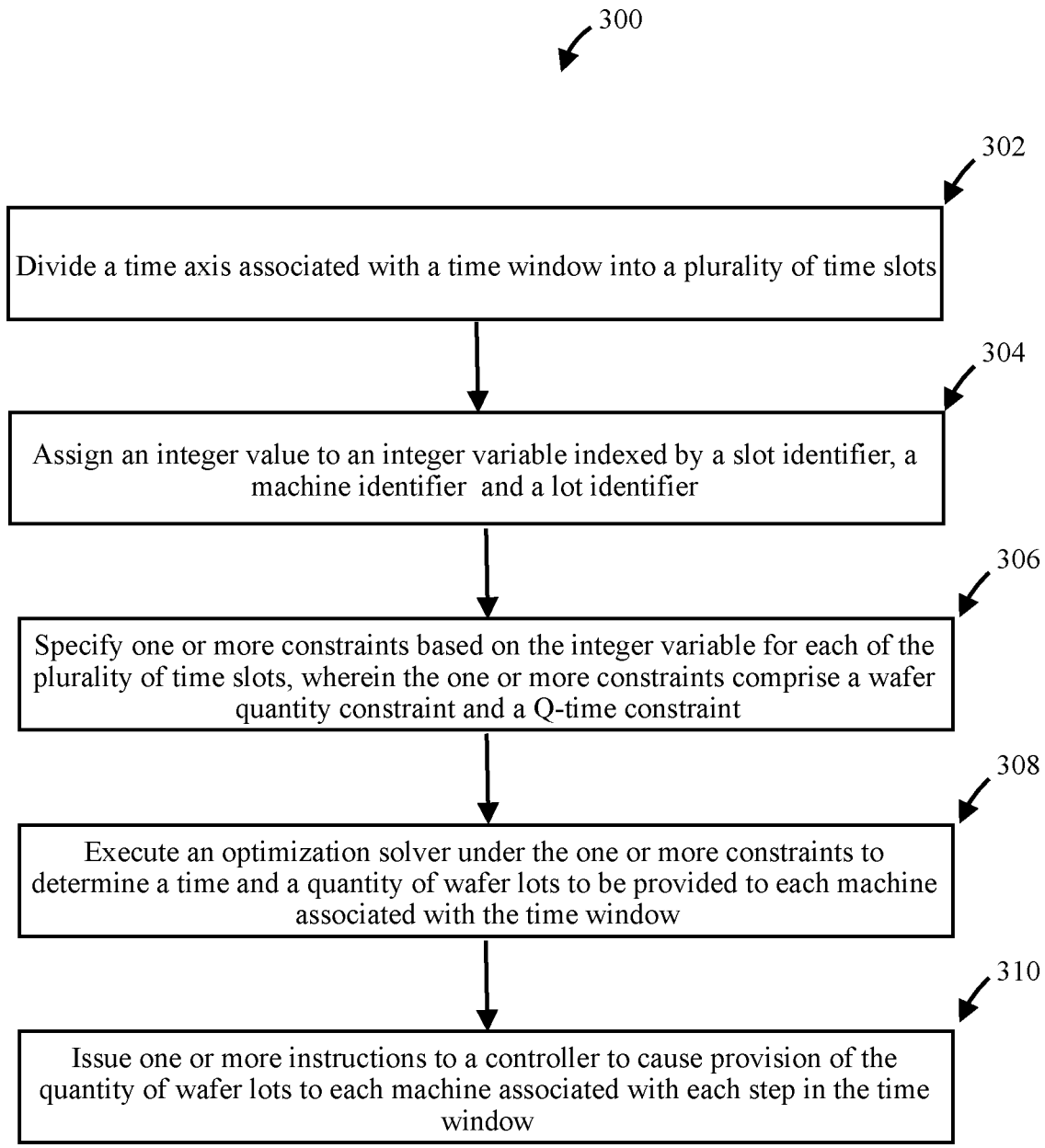
FIG. 3 depicts a flow diagram of a method for using an optimization algorithm to schedule a batch step according to an implementation of the present disclosure.

FIG. 3 depicts a flow diagram of a method 300 for using an optimization algorithm (e.g., a mixed integer linear programming) to schedule a batch step according to an implementation of the present disclosure. Method 300 may be performed by processing devices that may comprise hardware (e.g., circuitry, dedicated logic), computer readable instructions (e.g., run on a general purpose computer system or a dedicated machine), or a combination of both. Method 300 and each of its individual functions, routines, subroutines, or operations may be performed by one or more processors of the computer device executing the method. In certain implementations, method 300 may be performed by a single processing thread. Alternatively, method 300 may be performed by two or more processing threads, each thread executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be needed to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 300 may be performed by a processing device 102 executing the Q-time constrained scheduler 108 as shown in FIG. 1.

In one implementation, at 302, the processing device executing the Q-time constrained scheduler may divide a time axis associated with a time window (that needs scheduling) into uniformly distributed time slots. The time axis may be divided into slots, such as 10 minutes/slot. The length of each time slot (referred to as slot-length) can be selected based on a tradeoff between the computational complexity and accuracy. The longer time slot, the fewer the number of variables, hence the fewer equations to solve, and faster to find an optimal solution. However, the longer time slots may cause less than optimal solution or no solution. Accordingly, the processing time and Q-time can be rounded to the nearest time slots. For example, if a processing time of a machine on a wafer lot is 23 minutes while the time slot is set to be 10 minutes, then the processing time may be rounded to 30 minutes, or 20 minutes. The former overestimated the processing time, which may cause machine idle, while the latter underestimated the processing time, which may require further adjustment when a solution is computed.

After the determination of the time slots along the time axis, at 304, the processing device may assign an integer value to an integer variable indexed by a time slot identifier, a machine identifier, and a lot identifier. In one implementation, the processing device assign integer values (1 or 0) to integer function $X_{T,E,L,S}$ for each time slot in the following manner a) $X_{T,E,L,S}=1$ if at time slot T, machine E process lot L in step S, b) $X_{T,E,L,S}=0$ otherwise.

The integer variable $X_{T,E,L,S}$ may be defined in other ways. In one application, the index order may be different, such as $X_{L,S,E,T}$. In one implementation, L,S maybe combined into one identifier such Y, and the resulting variable may be $X_{T,E,Y}$. In other implementations, the relation between T, E, L, S may be implicit and the variables may appear to be some arbitrary strings such as X, Y, Z, etc.

The integer variable $X_{T,E,L,S}$ may be used to define constraints applicable to batch steps or non-batch steps. At 306, the processing device may specify one or more constraints based on the integer variable $X_{T,E,L,S}$ for each time slot. The one or more constraints may include a processing time constraint, a sequence constraint, a batch constraint, a wafer quantity constraint, and a Q-time constraint as well as other constraint.

For example, the one or more constraints may include a linear constraint. The requirement that each log L and step S needs to be processed by some machine E can be written as a linear constraint such as: $\Sigma X_{T,E,L,S}=1$, where the sum is over all T and E, where E is usable to process lot L step S, and E is up at time slot T.

The one or more constraints may include a wafer constraint associated with each machine. The requirement that each machine E at time slot T processes at most a quantity of W wafers can be written as: $\Sigma$ wafer(L)*$X_{T,E,L,S}<=W$, where the sum is over all lots L and steps S. For a batch machine, W maybe 100 or 125 if the batch allows 4 or 5 lots. For a non-batch machine, W may be 25 if the machine allows only 1 lot.

The one or more constraints may include a compatibility constraint. Since only lots of certain L and S may form a batch, additional requirements are needed to prevent incompatible wafer lots on the same machine at the same time: $X_{T,E,L,S}+X_{T,E,L',S'}<=1$, where (L', S') and (L', S') are incompatible, which is also called having different recipes or non-batchable recipes.

The start time of lot L step S may be written as variable $START_{L,S}$: $START_{L,S}=\Sigma time(T)*X_{T,E,L,S}$ where the sum is over all T and E, and time(T) is the starting time of time slot T.

The requirement that step S+1 is after step S is finished for a lot L may be written as: $START_{L,S+1}22 =START_{L,S}+ProcessTime(L, S)$.

If a machine E starts processing lot L of step S at time T, then no other lots may start on E between time slot T+1 till T+ProcessTime(L, S)/slot-length: $X_{T,E,L,S} + \Sigma X_{T',E,L',S'} = 1$, where the sum is over all T'=T+1, T+2, ..., T+ProcessTime (L,S)/slot-length, and over all L' and S' that may be processed by E.

The one or more constraints may include a Q-time constraint. The Q-time requirement between step S and step S+i may be written as: $START_{L,S+i} \leq START_{L,S} + Q\text{-time}(S, S+i)$ if the Q-time requires a maximum allowed time, or $START_{L,S+i} \geq START_{L,S} + Q\text{-time}(S, S+i)$ if the Q-time requires a minimum allowed time.

Machine down constraints may be specified as follows. If machine E is down at time T, then $X_{T,E,L,S} = 0$, for all L and S. An objective function for optimization may be defined to minimize the latest completion time of all lots: minimize $\Sigma START_{L,S}$, where the sum is over all lot L and its last step S. An objective function may be defined to minimize the weighted completion time, where urgent lots have higher weights: minimize $\Sigma \text{ weight}(L)*START_{L,S}$, where urgent lots have greater weight while non-urgent lots have lower weight, and the sum is over all lot L and its last step S.

A constant deadline D may be given to require that all lot steps (L, S) must be finished by the deadline: $START_{L,S} + ProcessTime(L, S) \leq D$. The constraints maybe simplified to include the last step S for lots L.

At 308, the processing device may execute an optimization solver under the one or more constraints to determine a quantity of wafer lots to be provided to each machine associated with the batch step S. In one implementation, the optimization solver is to optimize an objective function. In another implementation, the optimization solver can optimize under the one or more constraints without an objective function. In one implementation, a deadline D may be given and an objective functions may be omitted, which may be used to find a feasible solution. In one implementation, the optimization solver can be a mixed integer linear programming (MILP) solver that is suitable to solve the optimization problem where the constraints are specified in terms of the integer variable for each of the time slots.

At 310, the processing device may issue one or more instructions to a controller 104 to cause provision of the quantity of wafer lots to each machine associated with the steps. The delivery of the wafer lots will follow a schedule that ensures the efficient utilization of machines associated with the step without violating the Q-time constraint.

Figure 5B:

Referring to FIG. 2, in the case Option 1 is used to simplify some low utilization steps, Operation 3 may be executed at 206, after the scheduling for other (non low-utilization) steps is decided, solving each simplified step with the boundary condition of the scheduling. For example, after step 1 and step 4 are scheduled, the method may determine the starting time and finishing time of each wafer lot, and then schedule wafer lots for step 2 and step 3 as shown in FIG. 5B. If Option 1 is not used for a step, then Operation 3 can be omitted or skipped for that step.

The Operation 3 may be similarly implemented using the Mixed Integer Linear Programing (MILP) solver, in which the assignment of a wafer lot to a machine may be represented by an integer variable, and the starting time and finishing time for a machine to process a wafer lot may be bounded by the time of previous and following scheduled time.

Operation 4 may be executed at 208. Operation 4 may include the following: during Operation 3, if no possible solution can be found under the constraints or boundary conditions, lowering the utilization threshold to simplify fewer steps, and revising the estimated pass time and going back to Operation 1; During Operation 3, if a possible solution is found that uses less than estimated pass time, revising the estimated pass time and going back Operation 1 to re-compute the scheduling.

Figure 5C:
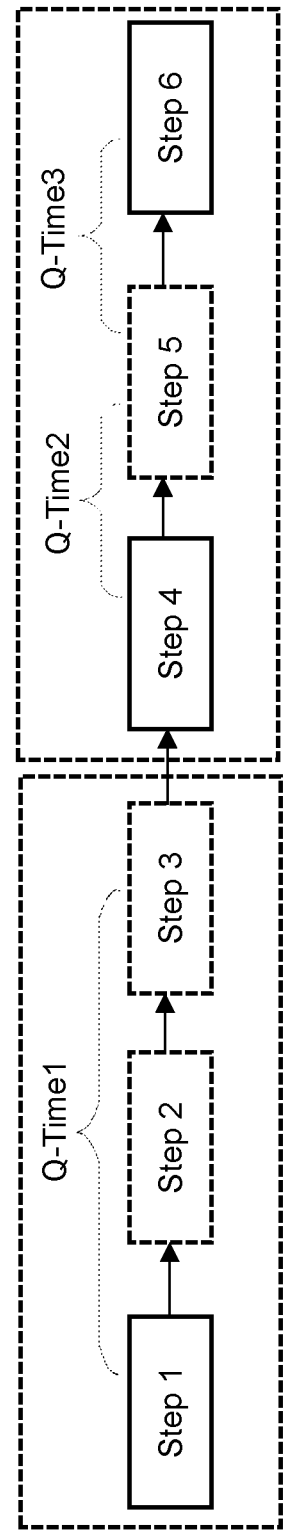

Implementations of the disclosure may further include the following speed-up improvements. In one implementation, the manufacture process may be divided into loops, where each loop has consecutive Q-zones but there are no Q-time constraints between loops. For example, if the Q-time requirement between step 3 and 4 in the flow in FIG. 1 does not exist, then the flow can be divided into 2 loops as shown in FIG. 5C. The first loop includes steps 1-3; the second loop includes steps 4-6. Thus, different loops may be scheduled independently, without causing Q-time violation contingent upon that all wafer lots of each loop at the same time are scheduled together. If different loops share the same machine or machines, then capacity division may be applied to the shared machine or machines so that each loop may be scheduled separately.

The implemented method may further include the following speed-up improvements. Wafer lots that share the same flow and can be processed on the same machines may be grouped together to reduce the number of variables. In certain situations, small variations in machine-usability may be tolerated in order to maximize the grouping. Single-step lots, such as engineering lots, can be processed separately and scheduled later after multiple-step lots are scheduled. Further, implementations may adjust length of the time slot by increasing or decreasing the length, to determine a balance between run time and accuracy.

Implementations of the disclosure may include a method that may be performed as part of a dispatcher system, or may issue instructions to instruct another dispatcher system. Implementations of the disclosure may include a method that may compute optimal schedule, that is, which wafer lot, at what time, and by which machine should process the lot. The implementations may eliminate or reduce Q-time violations, and may increase equipment utilization, and may reduce production cycle time.

Implementations of the disclosure may use certain information of the semiconductor plants to compute the optimal schedule, including information about wafer lots currently waiting to be processed. The information may include which wafer lots need to consider Q-time, which wafer lots have been reserved for certain machines, which wafer lots are designated lots whose Q-time constraint is required to be satisfied, which wafer lots are "hot" that needs to be processed as early as possible, which wafer lots are on hold and should not be scheduled, what is the product flow which defines the steps the wafer lots are required to go through, the definition of all Q-zones, the usable matrix that specifies which machine may process which wafer lots or steps, the status of all machines at present time, any planned equipment downtime in the future, etc. When computing optimal schedule, wafer lots already arrived may be considered, including wafer lots at the beginning of a Q-zone, lots being process in a Q-zone, and lots waiting to be processed in a Q-zone. Wafer lots that have not arrived at the first step of a Q-zone may be ignored and not considered in the computing of the optimal schedule.

An optional schedule may decide a sequence of time and machines for each lot already in the Q-zone to finish without violating any Q-time requirement, and use the minimum total time.

The implementations may allow the fab operator to set a safety margin. The safe margin may be used in computing the schedule. When a schedule satisfying the safety margin is applied to the real production, it is more likely to enable the Q-time constraint to be satisfied under some unexpected events, such as the processing time is longer or shorter than expected, or unscheduled machine down, or certain lots are held for inspection, or other events.

The safety margin may be specified as a percentage of machine time reserved, which may be called Utilization-buffer, or U-buffer. For example, the safety margin may require that the schedule may use at most 90% of the available machine time in every 24 hours, thus reserving 10% of the machine time to deal with such events as unexpected long processing time or machine down. For example, in a 24-hour window, if a machine is scheduled to be down for 4 hours, thus leaving 20 hours of available operation time. If the safety margin is set at 10%, then the scheduler may use at most (1-10%)*20 hour=18 hours of the machine time.

The safety margin may be specified as a percentage of Q-time increase, which may be called Q-time buffer, or Q-buffer. For example, if the Q-time requirement says steps S1, S2 and S3 must be finished within 120 minutes, and the safety margin is 10%, then the scheduler will schedule the three steps finished in (1-10%)*120 minutes=108 minutes.

The safety margin may be achieved by increasing the processing time of certain steps in a Q-zone by a certain percentage, which may be called processing time buffer, or T-buffer. For example, if the processing time for steps $S_1$, $S_2$ and $S_3$ are $T_1$, $T_2$ and $T_3$, respectively, and the safety margin is 10%, we may increase the processing time to $1.1*T_1$, $1.1*T_2$ and $1.1*T_3$ for the three steps, respectively.

Implementations of the disclosure may use the information about the lots, flows and machine, and under the safety margin, compute an optimal schedule. The optimal schedule may be computed using mixed integer linear programming, linear programming, combinatorial optimization, simulated annealing, genetic algorithms, branch-and-bound or any heuristics. The optimal or near optimal schedule specifies for each wafer lot, at what time and on what machine, the wafer lot will be processed.

The computed schedule may be in the form of lot assignment table (LAT) that specifies for each wafer lot, a machine and a time, which means the machine may process the wafer lot at that time. The time may be replaced by a time interval [earliest-time, latest-time], which means the lot may start processing on the machine after earliest-time and before latest-time.

The schedule may be used to direct production as follows. Any wafer lot not in the lot assignment table may not be processed. Any wafer lot in the lot assignment table may be processed by the machine specified, at the time point or in the time interval. If the time is outside of the time interval, the lot may not be processed at this time.

In some implementations, after an optimal schedule is computed, a simulator may be used to valid the performance under random events. Random events may include equipment down, processing time variation, and lot hold. The simulation may be performed multiple times to collect statistical average.

After a simulation is finished, certain key performance index (KPI) may be collected and examined. The KPI may include the number of Q-time violations, the number wafer lots processed, and waiting time of the wafer lots, the cycle time of the lots, etc.

If the number of Q-time violations considered too high by the fab operator, the safety margins may be increased and simulation repeated. In general, the higher the safety margins, the fewer Q-time violations, and the fewer wafer lots processed. On the other hand, the lower the safety margins, the more Q-time violations, and the more wafer lots processed.

A good balance between the number of Q-time violations and the number of wafer lots processed may be achieved by iteratively solve the scheduling problem, followed by simulation, and followed by adjusting the safety margins.

The scheduler may run periodically, such as once every 5 minutes or 10 minutes, as long as the data are updated soon enough. In general, the more often the scheduler runs, the better the scheduling results. However, this is provided that the scheduler is fast enough to finish in time.

Fail over rules may be used to deal with the situation the scheduler fails to produce a schedule in time. Redundant computer systems may be used to run the scheduler concurrently and scheduling results are sent to the dispatcher. If the scheduler fails to produce a lot assignment table in time, the dispatcher system may use a default rule. If the scheduler successfully produced a lot assignment table, then the table is used by the dispatcher to direct the production.

FIG. 4 depicts a block diagram of a computer system operating in accordance with one or more aspects of the present disclosure. In various illustrative examples, computer system 400 may correspond to a computing device within MES 102 of FIG. 1.

In certain implementations, computer system 400 may be connected (e.g., via a network, such as a Local Area Network (LAN), an intranet, an extranet, or the Internet) to other computer systems. Computer system 400 may operate in the capacity of a server or a client computer in a client-server environment, or as a peer computer in a peer-to-peer or distributed network environment. Computer system 400 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 400 may include a processing device 402, a volatile memory 404 (e.g., random access memory (RAM)), a non-volatile memory 406 (e.g., read-only memory (ROM) or electrically-erasable programmable ROM (EEPROM)), and a data storage device 416, which may communicate with each other via a bus 408.

Processing device 402 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 400 may further include a network interface device 422. Computer system 400 also may include a video display unit 410 (e.g., an LCD), an alphanumeric input device 412 (e.g., a keyboard), a cursor control device 414 (e.g., a mouse), and a signal generation device 420.

Data storage device 416 may include a non-transitory computer-readable storage medium 424 on which may store instructions 426 encoding any one or more of the methods or functions described herein, including instructions encoding the Q-time constrained scheduler of FIG. 1 for implementing method 300.

Instructions 426 may also reside, completely or partially, within volatile memory 404 and/or within processing device 402 during execution thereof by computer system 400, hence, volatile memory 404 and processing device 402 may also constitute machine-readable storage media.

While computer-readable storage medium 424 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "associating," "determining," "updating" or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 400 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
    dividing, by a processor of a manufacturing execution system (MES), a time axis associated with a time window for scheduling into a plurality of time slots;
    assigning an integer value to an integer variable indexed by a slot identifier, a machine identifier, and a wafer lot identifier;
    specifying one or more constraints based on the integer variable, wherein the one or more constraints comprise a wafer quantity constraint and a Q-time constraint;
    executing an optimization solver under the one or more constraints to determine a time and a quantity of wafer lots to be provided to each machine associated with the time window;
    issuing a request to a controller to cause provision of the quantity of wafer lots to each machine associated with each step in the time window; and
    responsive to receiving the request, the controller provisioning the quantity of wafer lots to each machine associated with each step in the time window.

2. The method of claim 1, wherein the manufacture execution system is to perform a manufacture process for wafer fabrication, the manufacture process comprising batch steps and non-batch steps, and the batch steps comprising the first batch step, wherein the first batch step is to process two or more wafer lots that arrive at the first batch step at different time points.

3. The method of claim 1, wherein the time axis associated with the time window has a first determined length of time, wherein each of the plurality of time slots has a second determined length of time that is smaller than the first determined length of time, and wherein the time window comprises at least one of a batch step or a non-batch step.

4. The method of claim 1, wherein assigning an integer value to an integer variable indexed by a slot identifier, a machine identifier, and a wafer lot identifier further comprises:
    assigning a non-zero integer value to the integer variable for a time slot identified by the slot identifier responsive to determining that at the time slot, a machine identified by the machine identifier processes a wafer lot identified by the wafer lot identifier in the time window; and
    assigning a zero value responsive to determining that the time slot, the machine does not process the wafer lot in the time window.

5. The method of claim 1, wherein the wafer quantity constraint specifies an upper limit of wafers that a machine identified by the machine identifier is capable of processing in the batch step, and wherein the Q-time constraint specifies a maximum allowable time period from a start time of the batch step to a start time of a next step.

6. The method of claim 5, wherein the one or more constraints further comprise at least one of a linear constraint that requires each wafer lot is processed by at least one machine in the time window, a compatibility constraint that prevents incompatible wafer lots from being processed by a same machine at a same time slot, a processing time constraint, a sequence constraint, or a batch constraint.

7. The method of claim 1, further comprising:
determining one or more steps that are consecutive in a manufacture process;
determining a passing time to process the one or more steps collectively; and
specifying the Q-time constraint taking into account the passing time.

8. The method of claim 7, further comprising:
responsive to executing the optimization solver under the one or more constraints to determine the quantity of wafer lots to be provided to each machine associated with the time window, executing a second optimization solver to determine provision of wafer lots in each of the one or more non-batch steps using the time window as a boundary condition.

9. The method of claim 1, further comprising:
one of specifying an objective function based on the integer variable, wherein the objective function comprises a completion time or a weighted completion time, or specifying the one or more constraints based on the integer variable, wherein the one or more constraints comprise a deadline by which a pre-determined number of wafer lots are required to finish processing.

10. The method of claim 1, wherein the one or more constraints are determined based on historical data of the manufacturing execution system, and the method further comprising assigning a safe margin to the Q-time constraint, wherein the safe margin is to ensure the Q-time constraint is satisfied in unexpected events.

11. The method of claim 1, wherein the request to the controller comprises a lot assignment table (LAT) that assign each of the quantity of wafer lots to a specific machine to be processed at a specific time.

12. A manufacturing execution system (MES), comprising
a storage device to store information relating to fabrication of wafers;
a processing device, communicatively coupled with the storage device, to:
divide a time axis associated with a time window for scheduling into a plurality of time slots;
assign an integer value to an integer variable indexed by a slot identifier, a machine identifier, and a wafer lot identifier;
specify one or more constraints based on the integer variable, wherein the one or more constraints comprise a wafer quantity constraint and a Q-time constraint;
execute an optimization solver under the one or more constraints to determine a time and a quantity of wafer lots to be provided to each machine associated with the time window; and
issue a request to a controller to cause provision of the quantity of wafer lots to each machine associated with each step in the time window; and
the controller, responsive to receiving the request, to provision the quantity of wafer lots to each machine associated with each step in the time window.

13. The manufacturing execution system of claim 12, wherein the manufacture execution system is to perform a manufacture process for wafer fabrication, the manufacture process comprising batch steps and non-batch steps, and the batch steps comprising the first batch step, wherein the first batch step is to process two or more wafer lots that arrive at the first batch step at different time points.

14. The manufacturing execution system of claim 12, wherein the time axis associated with the time window has a first determined length of time, and wherein each of the plurality of time slots has a second determined length of time that is smaller than the first determined length of time, and wherein the time window comprises at least one of a batch step or a non-batch step.

15. The manufacturing execution system of claim 12, wherein to assign an integer value to an integer variable indexed by a slot identifier, a machine identifier, and a wafer lot identifier, the processing device is further to:
assign a non-zero integer value to the integer variable for a time slot identified by the slot identifier responsive to determining that at the time slot, a machine identified by the machine identifier processes a wafer lot identified by the wafer lot identifier in the time window; and
assigning a zero value responsive to determining that the time slot, the machine does not process the wafer lot in the time window.

16. The manufacturing execution system of claim 12, wherein the wafer quantity constraint specifies an upper limit of wafers that a machine identified by the machine identifier is capable of processing in the batch step, and wherein the Q-time constraint specifies a maximum allowable time period from a start time of the batch step to a start time of a next step.

17. The manufacturing execution system of claim 16, the one or more constraints further comprise at least one of a linear constraint that requires each wafer lot is processed by at least one machine in the time window, a compatibility constraint that prevents incompatible wafer lots from being processed by a same machine at a same time slot, a processing time constraint, a sequence constraint, or a batch constraint.

18. The manufacturing execution system of claim 12, wherein the processing device is further to:
determine one or more steps that are consecutive in a manufacture process;
determine a passing time to process the one or more steps collectively; and
specify the Q-time constraint taking into account the passing time.

19. The manufacturing execution system of claim 12, wherein the processing device is further to assigning a safe margin to the Q-time constraint, wherein the safe margin is to ensure the Q-time constraint is satisfied in unexpected events.

20. A non-transitory machine-readable storage medium storing instructions which, when executed, cause a processing device to:
divide, by the processing device of a manufacturing execution system (MES), a time axis associated with a time window into a plurality of time slots;
assign an integer value to an integer variable indexed by a slot identifier, a machine identifier, and a wafer lot identifier;
specify one or more constraints based on the integer variable, wherein the one or more constraints comprise a wafer quantity constraint and a Q-time constraint;
execute an optimization solver under the one or more constraints to determine a time and a quantity of wafer lots to be provided to each machine associated with the time window; and
issue a request to a controller to cause provision of the quantity of wafer lots to each machine associated with each step in the time window, wherein responsive to receiving the request, the controller is to the quantity of wafer lots to each machine associated with each step in the time window.

* * * * *